Oct. 25, 1960   F. A. ECKERLE   2,957,453
CARTRIDGE STRUCTURE WITH TRAP COMPARTMENT
Filed June 30, 1959
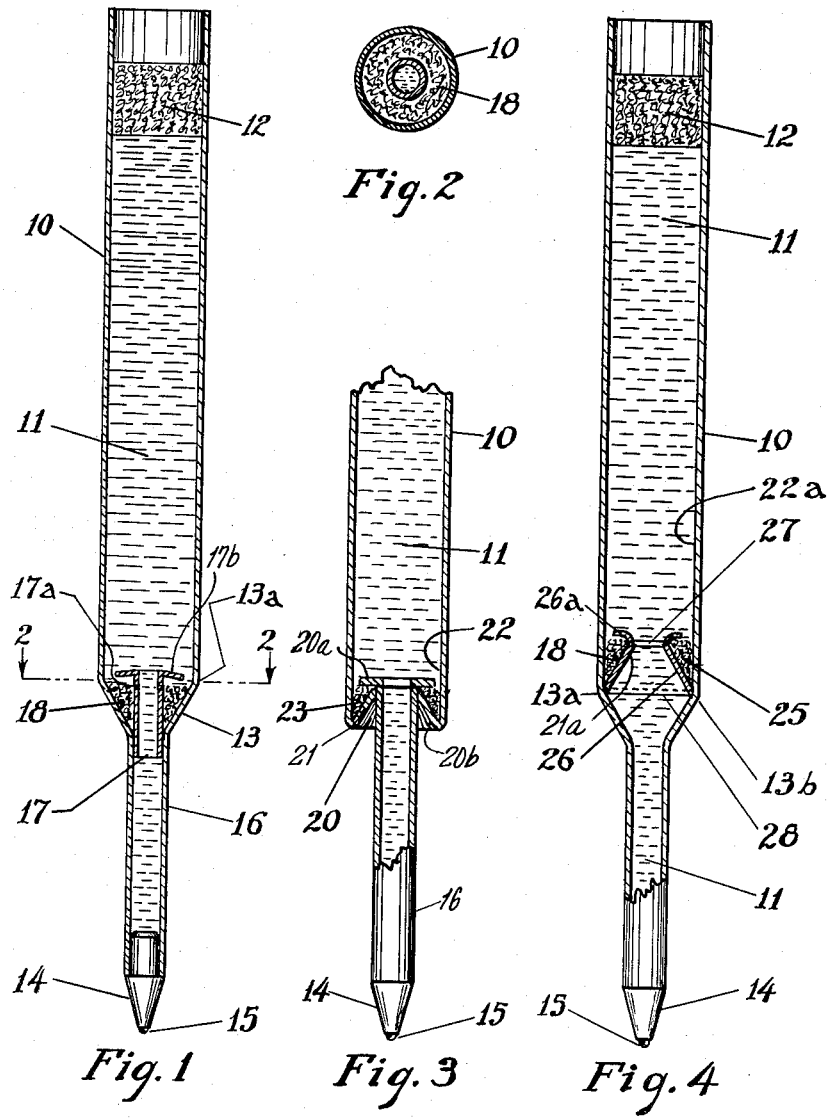
INVENTOR.
FRANK A. ECKERLE
BY United States Patent Office 2,957,453
Patented Oct. 25, 1960

2,957,453
CARTRIDGE STRUCTURE WITH TRAP COMPARTMENT

Frank A. Eckerle, Hackensack, N.J., assignor to Northern Industrial Products Company Filed June 30, 1959, Ser. No. 823,965

4 Claims. (Cl. 120—42.4)

This invention relates to ball point pen structures and in particular to improvements in or relating to cartridges used in connection with ball point pens.

Cartridges for ball point pens have been employed in which the column of ink contains besides coloring matter paste-like or semi-liquid substances variously compounded in order to apply the ink by means of the nib to paper surfaces of different qualities.

In ink compositions now on the market it has been observed that they contain very often foreign matter such as dust particles, undissolved dye particles, oil, grease and metal particles or such substances not compatible with the ink mass. The column of ink mass usually has a follower which comprises grease or oily ingredients which when separated from the ink follower penetrate the column of ink mass, adhere to the walls of the cartridge and are very often moved with the ink mass toward the nib of the ball point pen.

The present invention contemplates obviating these and other disadvantages and provides means for separating foreign matter suspended in or in any other way separated from the ink mass.

It is another important object of the present invention to provide means conducive to collection of foreign matter from the ink column in the cartridge before the ink reaches the ball point, and to retain such foreign matter without impeding the flow of the ink column toward the ball point.

Yet a further object of the present invention is to provide means insuring the retainment of the collected foreign matter in a trap compartment forming part of the cartridge containing the ink column.

Still another object of the present invention is to provide means preventing escape of the foreign matter from said trap compartment or pocket and causing said foreign matter to settle and if possible to cake therein.

Yet a further object of the invention is to provide means aiding in unobstructively guiding the column of ink along the wall of the cartridge toward the ball point and to provide also means envisioning deviation of foreign matter contained in the ink column to a trap or pocket forming at least a part of the wall confining the column of ink and prior to its reaching the ball point.

Still a further object of the present invention is to provide means redounding to a very efficacious device either integral with or forming part of the cartridge for separating out and collecting disintegrated particles from or any foreign matter entrained by the column of ink along its path of feed toward the ball point.

A still further object of the present invention resides in the provision of means bringing about cleaning and maintaining uniform flow conditions for the ink column during its feed toward the nib or ball point of the writing instrument.

These and other objects of the invention will become further apparent from the following detailed description, reference being made to the accompanying drawing showing a preferred embodiment of the invention.

In the drawing:

Fig. 1 is a vertical sectional view through the cartridge embodying the invention;

Fig. 2 is a cross-sectional view taken along lines 2—2 of Fig. 1;

Fig. 3 is a fragmentary vertical sectional view of the cartridge pursuant to the present invention seen in a modified form;

Fig. 4 is a vertical sectional view of a cartridge embodying another modification of the invention.

Referring now in particular to the drawing, there is shown in Fig. 1 a tubular cartridge body 10 made from metal, plastic or plastic composition and containing a column of ink 11 of any known composition. The ink may contain dye-stuff or any other known coloring matter, may be liquid, pasty, or semi-liquid in accordance with the purpose for which the cartridge is to be employed.

Rearwardly of column 11 is a follower 12 having any dimension and made of suitable material such as a greasy or gelatinous mass, preferably a viscous pulpy material which can readily follow the ink column, does not mix or m:ngle with the ink and conforms readily to the diameter of the cartridge.

Cartridge 10 has a constricted or conical portion 13 toward its forward end and carries at its nib 14 a ball 15 in a well-known manner. Tightly fitted in a reduced tubular portion 16 is a sleeve-shaped member 17 whose outer wall together with the inner wall of the conically-shaped cartridge portion 13 forms a pocket or trap compartment 18 for a purpose later described. The end 17a of sleeve 17 is about level with the end 13a of conical cartridge portion 13 and is provided with a crimped-over portion 17b preferably integral with sleeve 17. This portion 17b is downwardly directed to assume roof-shaped configuration and terminates with its outermost ends short of the inner wall of the cartridge 10 to prevent escape of any trapped foreign matter from pocket 18. Thus, the pocket or trap compartment 18 created internally of cartridge 10 insures collection of foreign matter separated from the ink while the column thereof moves toward the ball point. The trap formation 18 may however be further modified, such as shown in Fig. 3, wherein the con:cally-shaped cartridge portion 13 of Fig. 1 is pushed into the interior of cartridge 10 and forms an outer conically shaped portion 20 whose inner wall 21 defines with the inner surface 22 of cartridge 10 a pocket 23 for collecting any foreign matter derived from the ink 11.

A ring-shaped flat or slanted roof-forming plate member 20a is connected in any way to the top of portion 20 to serve a similar purpose as stated with respect to retainer portion 17b.

Instead of pushing smooth conical portion 13 of Fig. 1 into the interior of cartridge 10 as seen at 20 in Fig. 2, the inner surface 21 of the pushed-up deformed cartridge wall may be provided with a plurality of teeth-like or rib-shaped surface portions 20b which enlarge the inner surface 21, making the same rather uneven which thus affords ready settlement of foreign matter deposited in pocket 23 and causing caking of said matter.

Fig. 4 shows cartridge 10 with a pocket 25 created between the inner wall surface 22a and the inner surface 21a of a washer or like element 26. This element has a central opening 27 of smaller diameter than opening 28 at the bottom thereof which is located closer to the constricted portion 16 of the cartridge. This conical-shaped insert element 26 is fixed to the interior of the cartridge and abuts against the inner surface of conical part 13a at 13b and has an upper outwardly curved top or roof-shaped portion 26a for impeding foreign matter 18 once trapped in pocket 25 from escaping from the latter.

It is further to be mentioned that upper extensions 17b (Fig. 1), 20a (Fig. 3) and 26a Fig. 4) aid also in breaking up larger particles or compact pasty ink and like ingredients prior to their arrival in the constricted tubular portion 16.

Thus the writing efficiency of the ink will be greatly enhanced.

In the pocket 25 thus created between the inner wall and inner surface 22a of tubular cartridge body 10 and the inner surface of the conically shaped element 26, there may be collected any foreign matter 18 of any nature generally separated or disintegrated from the ink mass during use thereof and while same moves and is guided along wall 22a. Thus, it will be effectively avoided that such foreign matter is being dispensed by or will clog the exit at ball point 15.

The barrel of the ball-equipped cartridge may have any appropriate shape and cross-section.

Although the trap or pocket shown in the embodiments forms an annulus, it is well understood that the aforesaid pocket or compartment may assume other shapes with rough and suitable other inner surface configurations for facilitating arrest of foreign particles derived from the ink column.

It has been observed that the chances of foreign matter travelling along the exact center of the fluid column in view of the fact that the side walls of the cartridge have greater molecular attraction is very minute indeed. This is even more pronounced in the case of a liquid of lower specific gravity, travelling from the open upper end toward the ball point in an inverted cartridge; slight surface tension, specific gravity and molecular attraction differences cause the path of travel to be against the side wall of the cartridge.

The structure herein disclosed has among other advantages that the forward part of the cartridge is greatly reinforced and besides forming an annular shaped pocket or trap compartment for foreign matter may act as a sieve if, for instance, sleeve 17a or washer 26 is perforated. In any event, the flow of the ink column toward the nib will not be in any way impeded.

It can thus be seen that there has been provided in accordance with the present invention a cartridge structure for holding a column of ink, said cartridge having a tubular wall for guiding said ink column on its path to the ball point of the cartridge.

The cartridge has further a trap forming a pocket or pocket sections for retaining foreign matter entrained by said ink column, whereby said pocket is at least partly constituted by a portion of said tubular wall and is located in the proximity of the ball point and before the ink reaches the latter.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a ball point equipped cartridge; a tubular wall confining an ink column, trap-forming means for foreign matter from the ink column and for retaining said foreign matter prior to said ink column reaching said ball point, and roof-shaped means located on the topmost end of said trap-forming means and extending therebeyond toward and terminating short of said tubular wall to impede escape of said foreign matter from said trap-forming means, said trap-forming means being a sleeve-shaped element engaging said wall at the inner surface thereof and concentrically spaced from the remainder of said wall, said element being located in the proximity of said ball point, whereby a pocket is constituted between said element and the adjacent tubular wall for collecting foreign matter from said ink column.

2. In a cartridge according to claim 1, said trap-forming means being integral with said tubular wall and projecting in upward and lateral direction therebeyond and being spaced from the inner surface of said tubular wall.

3. In a cartridge according to claim 1, said trap-forming means including a conical wall diverging toward said ball point, said topmost end being offset with respect to the remainder of said trap-forming means.

4. In a cartridge according to claim 3, said conical wall being made of sieve-forming material and being provided with ribs presenting an inner rough surface of said trap-forming means, thereby to retain and arrest foreign particles derived from the ink column.

References Cited in the file of this patent

UNITED STATES PATENTS

| 2,435,123 | Biro | Jan. 27, 1948 |
| 2,834,321 | Dufresne | May 13, 1958 |
| 2,883,969 | Sams | Apr. 28, 1959 |

FOREIGN PATENTS

| 650,804 | Great Britain | Mar. 7, 1951 |
| 653,385 | Great Britain | May 16, 1951 |
| 1,023,144 | France | Dec. 24, 1952 |
| 495,379 | Canada | Aug. 18, 1953 |